US010629990B2

(12) United States Patent
Lee et al.

(10) Patent No.: US 10,629,990 B2
(45) Date of Patent: Apr. 21, 2020

(54) ANTENNA STRUCTURE

(71) Applicants: Li-Chun Lee, Taipei (TW); Shih-Chia Liu, Taipei (TW); Yen-Hao Yu, Taipei (TW); Jhin-Ciang Chen, Taipei (TW); Chao-Lin Wu, Taipei (TW); Jui-Hung Lai, Taipei (TW)

(72) Inventors: Li-Chun Lee, Taipei (TW); Shih-Chia Liu, Taipei (TW); Yen-Hao Yu, Taipei (TW); Jhin-Ciang Chen, Taipei (TW); Chao-Lin Wu, Taipei (TW); Jui-Hung Lai, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 70 days.

(21) Appl. No.: 15/719,567

(22) Filed: Sep. 29, 2017

(65) Prior Publication Data

US 2018/0090850 A1    Mar. 29, 2018

Related U.S. Application Data

(60) Provisional application No. 62/401,831, filed on Sep. 29, 2016.

(51) Int. Cl.
*H01Q 21/06*    (2006.01)
*H01Q 13/10*    (2006.01)
(Continued)

(52) U.S. Cl.
CPC .......... *H01Q 5/371* (2015.01); *H01Q 1/2266* (2013.01); *H01Q 1/243* (2013.01); *H01Q 1/52* (2013.01);
(Continued)

(58) Field of Classification Search
CPC ...... H01Q 5/371; H01Q 21/30; H01Q 13/106; H01Q 9/0421; H01Q 1/2266;
(Continued)

(56) References Cited

U.S. PATENT DOCUMENTS

2009/0066596 A1\* 3/2009 Fujishima .............. H01Q 1/243
                                                                 343/767
2014/0266938 A1    9/2014 Ouyang et al.

FOREIGN PATENT DOCUMENTS

| CN | 105742823 | 7/2016 |
| TW | 201338269 | 9/2013 |

OTHER PUBLICATIONS

"Office Action of Taiwan Counterpart Application", dated Nov. 14, 2018, p. 1-p. 6.
(Continued)

*Primary Examiner* — Hai V Tran
*Assistant Examiner* — Michael M Bouizza
(74) *Attorney, Agent, or Firm* — JCIPRNET

(57) ABSTRACT

An antenna structure including a metal element, a first capacitor, a second capacitor, a feeding element and an adjustment element is provided. The metal element has an open slot, and the open slot has an open end, a first slot and a second slot. The first slot and the second slot are respectively disposed on two opposite sides of the open end. The feeding element crosses the first slot. A first end of the feeding element has a feeding point, and a second end of the feeding element is electrically connected to the metal element through the first capacitor. The adjustment element is disposed in the second slot. A first end of the adjustment element is electrically connected to the metal element, and a second end of the adjustment element is electrically connected to the metal element through the second capacitor.

12 Claims, 5 Drawing Sheets

(51) Int. Cl.
  *H01Q 5/50* (2015.01)
  *H01Q 9/04* (2006.01)
  *H01Q 5/371* (2015.01)
  *H01Q 21/30* (2006.01)
  *H01Q 1/22* (2006.01)
  *H01Q 1/24* (2006.01)
  *H01Q 1/52* (2006.01)
  *H01Q 7/00* (2006.01)
  *H04L 29/06* (2006.01)

(52) U.S. Cl.
  CPC ............. *H01Q 5/50* (2015.01); *H01Q 9/0421* (2013.01); *H01Q 9/0457* (2013.01); *H01Q 13/10* (2013.01); *H01Q 13/106* (2013.01); *H01Q 21/064* (2013.01); *H01Q 21/30* (2013.01); *H01Q 7/00* (2013.01); *H04L 69/18* (2013.01)

(58) Field of Classification Search
  CPC .... H01Q 21/064; H01Q 1/243; H01Q 9/0457; H01Q 5/50; H01Q 1/52; H01Q 13/10; H01Q 7/00; H04L 69/18
  See application file for complete search history.

(56) References Cited

OTHER PUBLICATIONS

Kin-Lu Wong, et al., "Very-Low-Profile Hybrid Open-Slot/Closed-Slot/Inverted-F Antenna for the LTE Smartphone," Microwave and Optical Technology Letters , vol. 58, Jul. 2016, pp. 1572-1577.

* cited by examiner

ANTENNA STRUCTURE

CROSS-REFERENCE TO RELATED APPLICATION

This application claims the priority benefit of U.S. provisional application Ser. No. 62/401,831, filed on Sep. 29, 2016. The entirety of the above-mentioned patent application is hereby incorporated by reference herein and made a part of this specification.

BACKGROUND OF THE INVENTION

Field of the Invention

The invention relates to an antenna structure, and particularly relates to an antenna structure including an open slot.

Description of Related Art

As technology advances, wireless communication technologies are widely used in various electronic devices such as smartphones, tablet computers, and laptops. Moreover, an antenna structure plays an important role in wireless communication of electronic devices and is closely related to the quality of wireless communication of electronic devices. In addition, in order to satisfy user's requirements, the antenna structure must have a characteristic of multi-band operation, such that the electronic device may support multiple wireless communication protocols to provide diversified functions.

SUMMARY OF THE INVENTION

The invention is directed to an antenna structure including a metal element having an open slot, and a feeding element and an adjustment element are configured corresponding to a first slot and a second slot in the open slot. In this way, the antenna structure has the characteristic of multi-band operation.

The invention provides an antenna structure including a metal element, a first capacitor, a second capacitor, a feeding element and an adjustment element. The metal element has an open slot, and the open slot has an open end, a first slot and a second slot. The first slot and the second slot are respectively disposed on two opposite sides of the open end. The feeding element crosses the first slot. A first end of the feeding element has a feeding point, and a second end of the feeding element is electrically connected to the metal element through the first capacitor. The adjustment element is disposed in the second slot. A first end of the adjustment element is electrically connected to the metal element, and a second end of the adjustment element is electrically connected to the metal element through the second capacitor.

In an embodiment of the invention, the antenna structure is operated in a first frequency band, and a length of the first slot is ¼ wavelength of the first frequency band.

In an embodiment of the invention, the antenna structure is operated in a second frequency band, and a length of the second slot is ¼ wavelength of the second frequency band.

According to the above description, the antenna structure of the invention includes the metal element having the open slot, and the feeding element and the adjustment element are configured corresponding to the first slot and the second slot in the open slot. Moreover, the feeding element is electrically connected to the metal element through the first capacitor, and the adjustment element is electrically connected to the metal element through the second capacitor. In this way, the antenna structure has the characteristic of multi-band operation.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
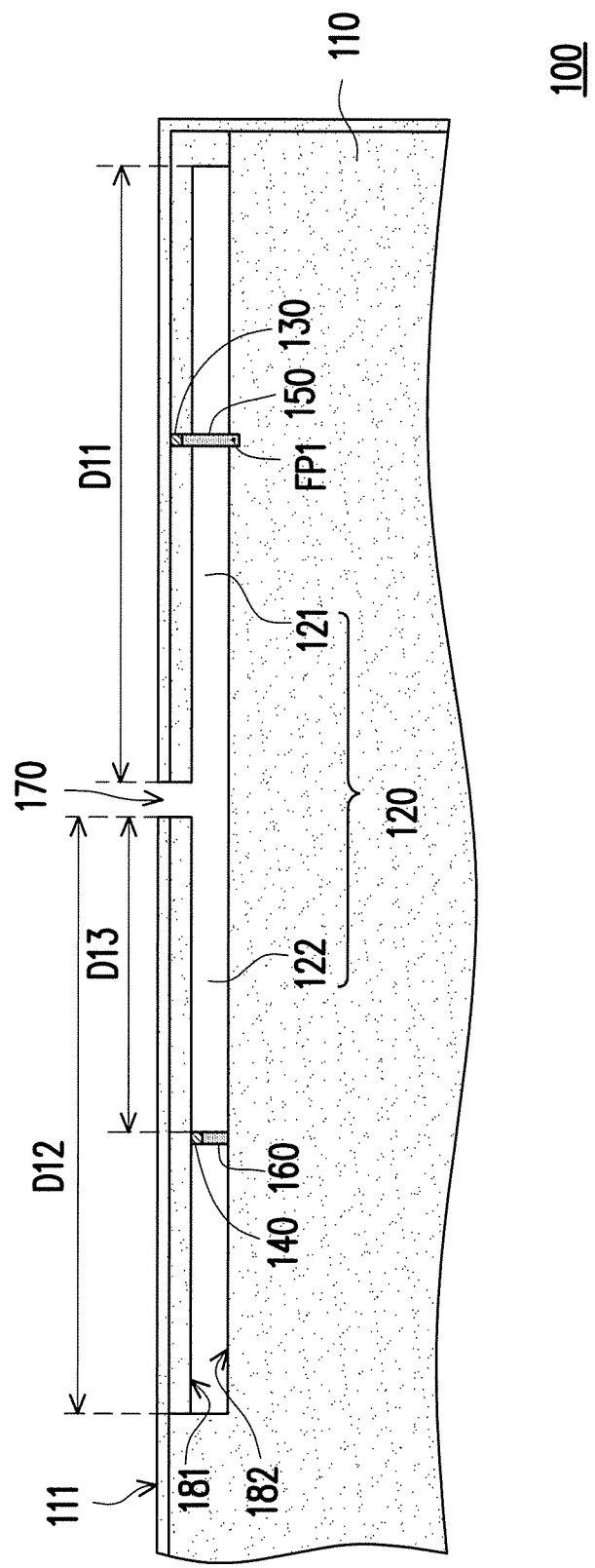
FIG. 1 is a schematic diagram of an antenna structure according to an embodiment of the invention.

FIG. 1 is a schematic diagram of an antenna structure according to an embodiment of the invention. As shown in FIG. 1, the antenna structure 100 includes a metal element 110, a first capacitor 130, a second capacitor 140, a feeding element 150 and an adjustment element 160. The metal element 110 has an open slot 120, and the open slot 120 has an open end 170, a first slot 121 and a second slot 122. The first slot 121 and the second slot 122 are respectively disposed on two opposite sides of the open end 170.

The feeding element 150 is located above the first slot 121 and crosses the first slot 121. A first end of the feeding element 150 has a feeding point FP1, and a second end of the feeding element 150 is electrically connected to the metal element 110 through the first capacitor 130. The adjustment element 160 is disposed in the second slot 122. A first end of the adjustment element 160 is electrically connected to the metal element 110, and a second end of the adjustment element 160 is electrically connected to the metal element 110 through the second capacitor 140. To be specific, the adjustment element 160 and the second capacitor 140 are connected to each other and crossed the second slot 122. The adjustment element 160 and the second capacitor 140 are respectively connected to two sides 181 and 182 of the second slot 122.

In operation, the open slot 120 of the metal element 110 may be used to constitute an open slot antenna, and the feeding element 150 may be used to excite the open slot antenna, such that the open slot antenna may be operated in a plurality of frequency bands. In detail, the feeding point FP1 of the feeding element 150 is electrically connected to a wireless communication module through a coaxial cable, and the first capacitor 130 connected to the feeding element 150 may be used for adjusting impedance matching of the antenna structure 100.

Under excitation of a feeding signal, the antenna structure 100 may generate a first low frequency mode through the first slot 121, so as to operate in a first frequency band, and generate a second low frequency mode through the second slot 122, so as to operate in a second frequency band. The first frequency band and the second frequency band are combined into a wideband mode. Moreover, the open slot 120 has a third slot extended from the open end 170 to the adjustment element 160. The antenna structure 100 may further generate a high frequency mode through the third slot, so as to operate in a third frequency band. To be specific, the second capacitor 140 connected to the adjustment element 160 allows a high frequency signal to pass through. Therefore, the adjustment element 160 and the second capacitor 140 may form a conduction path for the high frequency signal, such that the open slot 120 may form the third slot extended from the open end 170 to the adjustment element 160.

Figure 2:
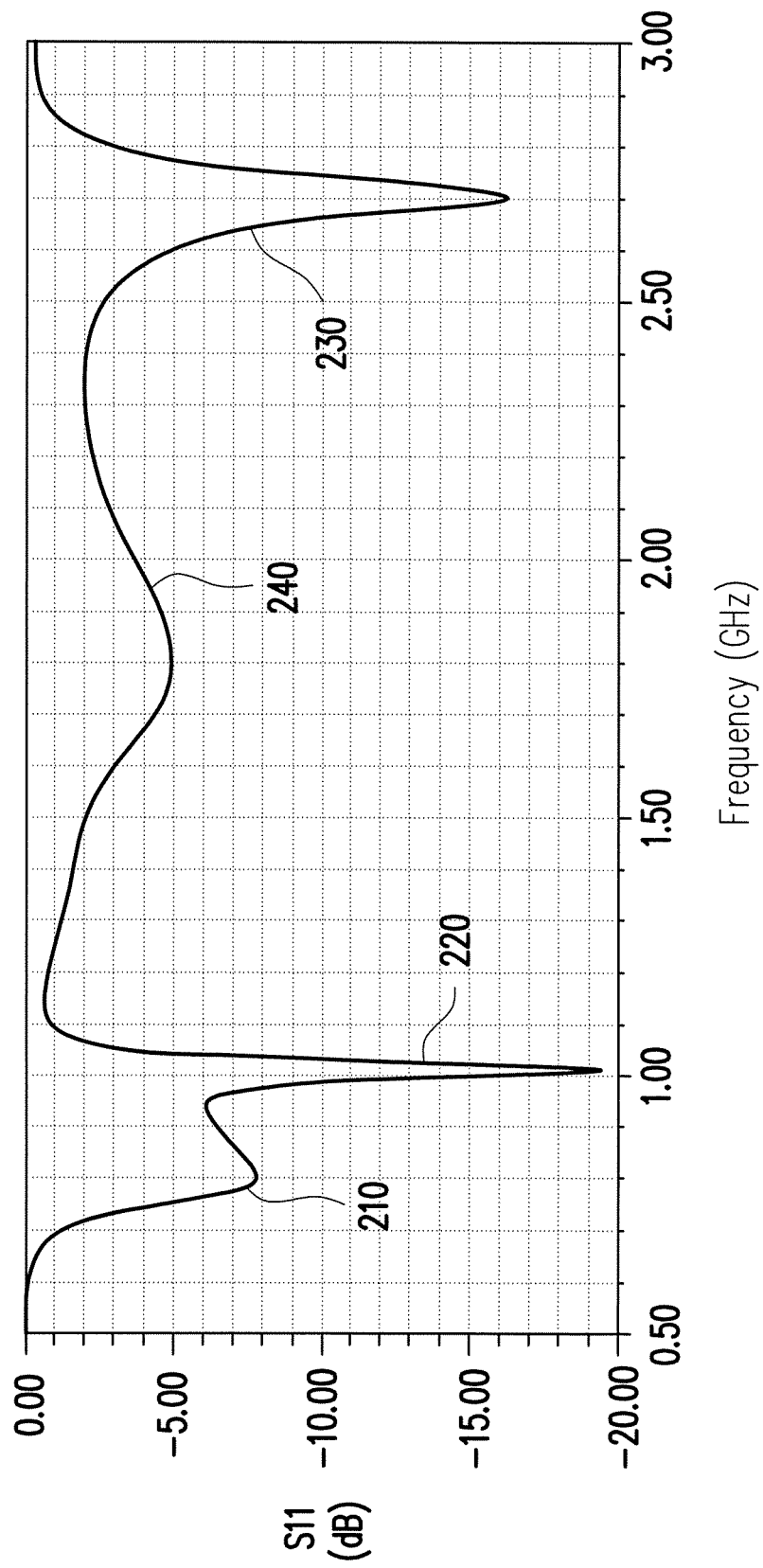
FIG. 2 is a diagram illustrating S parameter (S11) of the antenna structure according to an embodiment of the invention.

For example, FIG. 2 is a diagram illustrating S parameter (S11) of the antenna structure according to an embodiment of the invention. As shown in FIG. 2, the antenna structure 100 may generate a first low frequency mode 210 through the first slot 121, and generate a second low frequency mode 220 through the second slot 122. Moreover, the first low frequency mode 210 and the second low frequency mode 220 may be combined to extend a bandwidth of the low frequency band covered by the antenna structure 100. On the other hand, the antenna structure 100 may further generate a high frequency mode 230 through the third slot, and the high frequency mode 230 is combined with a frequency doubling mode 240 of the first low frequency mode 210 to extend the bandwidth of the high frequency band covered by the antenna structure 100.

It should be noted that the antenna structure 100 directly uses the open slot 120 of the metal element 110 to form the open slot antenna, and the antenna structure 110 may use the single open slot 120 to cover the first frequency band to the third frequency band, so as to achieve the characteristic of multi-band operation. In this way, the electronic device having the antenna structure 100 may support a plurality of wireless communication protocols, so as to provide diversified functions.

Referring to FIG. 1 again, a length D11 of the first slot 121 is about ¼ wavelength of the first frequency band. A length D12 of the second slot 122 is about ¼ wavelength of the second frequency band. The length of the first slot 121 is greater than the length of the second slot 122. A length of the third slot, i.e. a length D13 from the adjustment element 160 to the open end 170 of the open slot 120 is about ¼ wavelength of the third frequency band. The feeding element 150 may be correspondingly disposed at a middle position of the first slot 121, i.e. a length from the feeding element 150 to the open end 170 of the open slot 120 is ⅛ wavelength of the first frequency band.

Furthermore, the open end 170 of the open slot 120 is located at an edge 111 of the metal element 110, and a shape of the open slot 120 is a T-shape. Moreover, a shape of the first slot 121 is a long-strip shape, and a shape of the second slot 122 is also a long-strip shape. The first slot 121 and the second slot 122 are respectively parallel to the edge 111 of the metal element 110.

Figure 3:
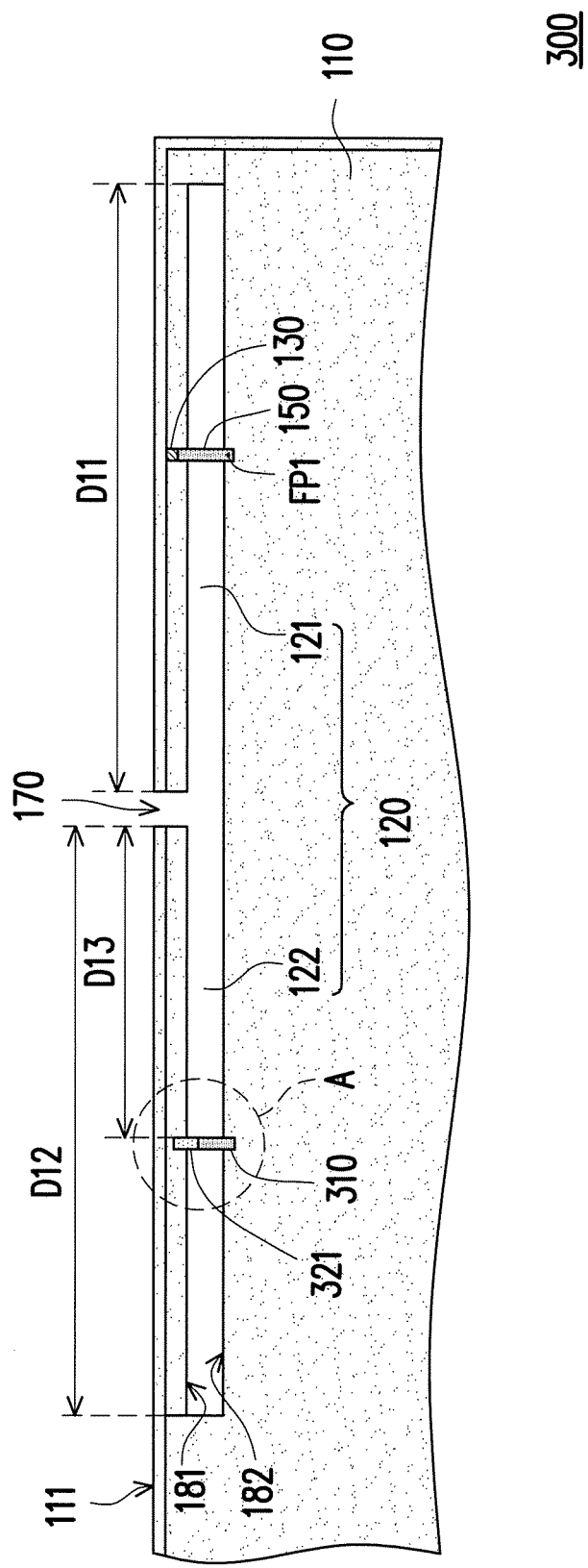
FIG. 3 is a schematic diagram of an antenna structure according to another embodiment of the invention.
Figure 4:
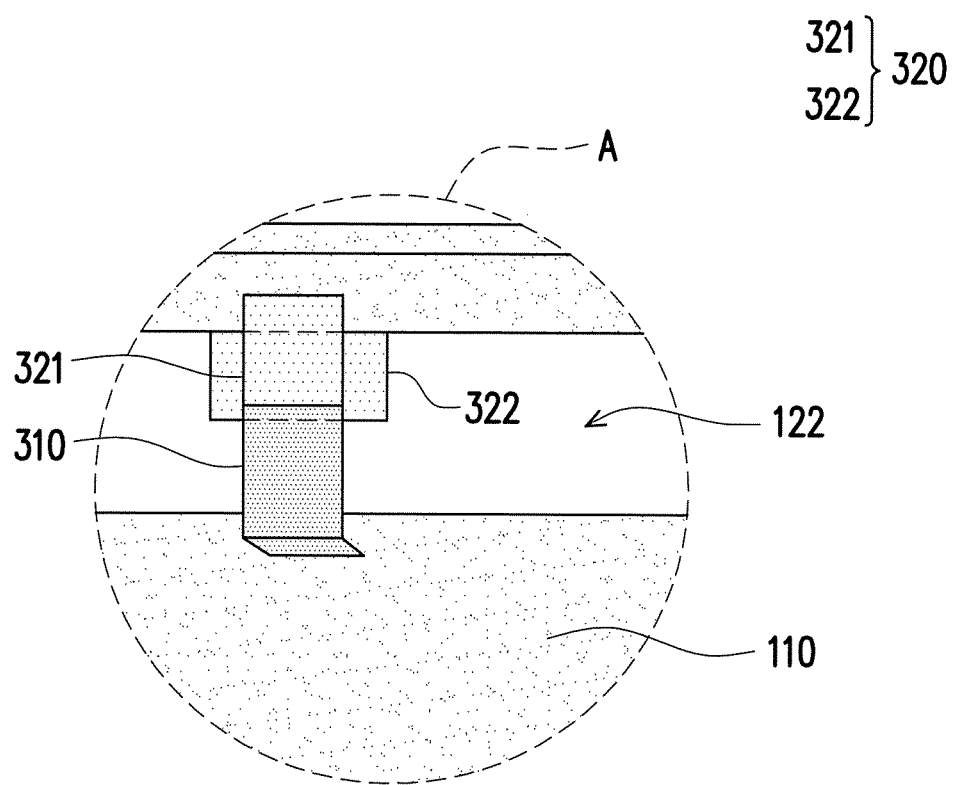
FIG. 4 is an enlarged view of a region A of FIG. 3.

It should be noted that the first capacitor 130 and the second capacitor 140 of FIG. 1 may be respectively a chip capacitor. In another embodiment, the first capacitor 130 and the second capacitor 140 may be respectively a distributed capacitor. For example, FIG. 3 is a schematic diagram of an antenna structure according to another embodiment of the invention, and FIG. 4 is an enlarged view of a region A of FIG. 3. Compared to the embodiment of FIG. 1, an adjustment element 310 of the antenna structure 300 is located above the second slot 122, and a second capacitor 320 of the antenna structure 300 is constituted by a first conductive sheet 321 and a second conductive sheet 322.

To be specific, a first end of the adjustment element 310 is electrically connected to the metal element, and a second end of the adjustment element 310 is electrically connected to the first conductive sheet 321. The second conductive sheet 322 is located in the second slot 122, and the second conductive sheet 322 is electrically connected to the metal element 110. In view of configuration, an orthogonal projection of the second conductive sheet 322 on the metal element 110 is partially overlapped with an orthogonal projection of the first conductive sheet 321 on the metal element 110, so as to form the second capacitor 320 (i.e., the distributed capacitor). Detailed configurations and operations of the components of the embodiment of FIG. 3 are included in the embodiment of FIG. 1, and description thereof is not repeated.

Figure 5:
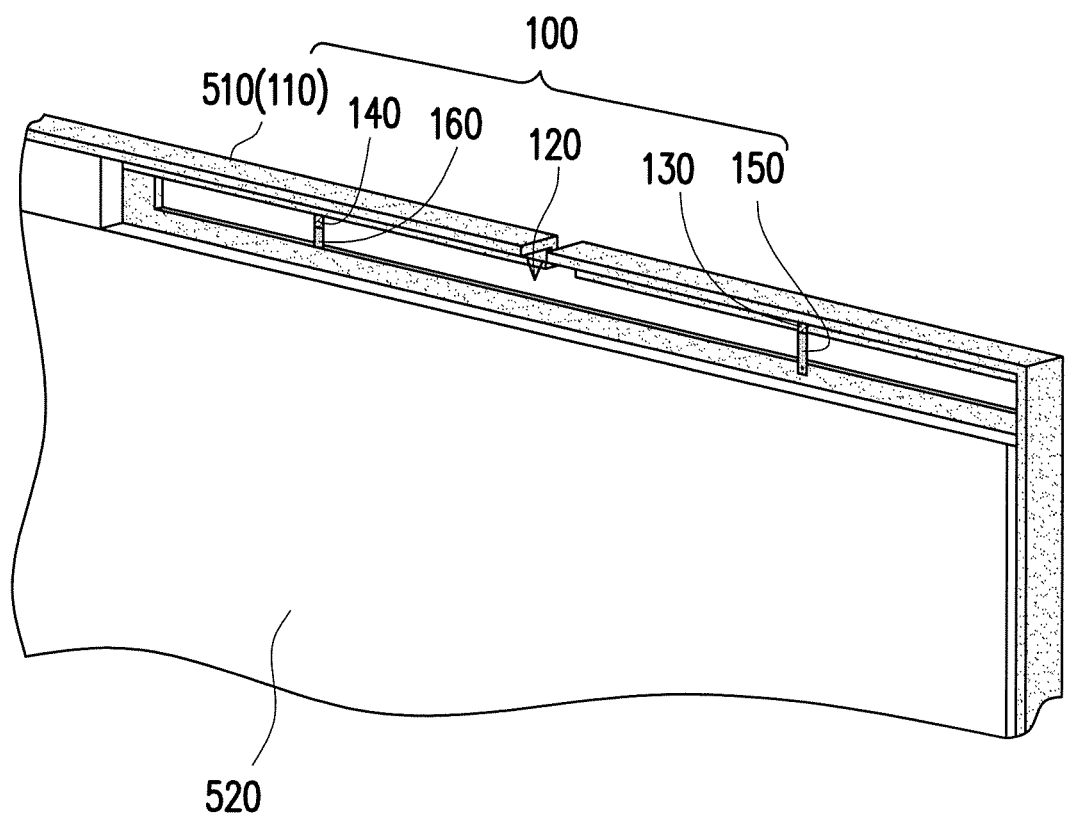
FIG. 5 and FIG. 6 are front and rear schematic diagrams an electronic device according to an embodiment of the invention.
Figure 6:
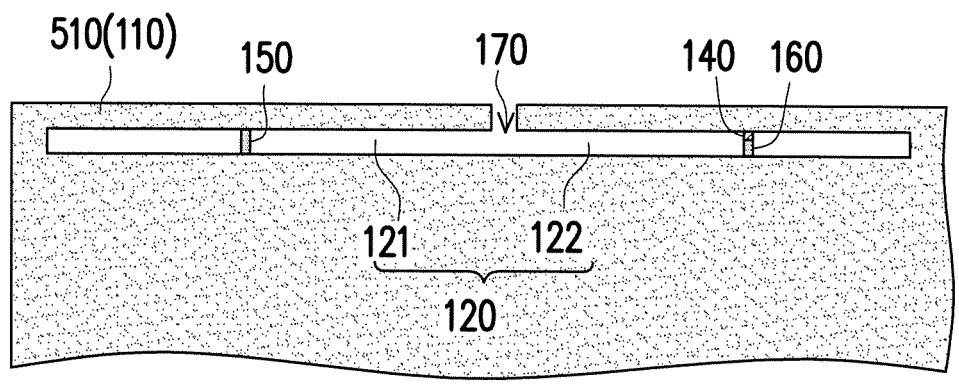

It should be noted that each of the aforementioned antenna structures is adapted to an electronic device, and a metal housing of the electronic device may be used to form the metal element 110 of each of the antenna structures. For example, FIG. 5 and FIG. 6 are front and rear schematic diagrams of an electronic device according to an embodiment of the invention, and FIG. 5 and FIG. 6 adopt the antenna structure 100 of FIG. 1 for illustration. As shown in FIG. 5 and FIG. 6, the electronic device includes a metal back cover 510 and a display panel 520. The metal back cover 510 may be used for constructing the metal element 110 of the antenna structure 100, and the open slot 120 of the antenna structure 110 may be disposed on the metal back cover 510. Moreover, an orthogonal projection of the display panel 520 on the metal back cover 510 is not overlapped with the open slot 120 on the metal back cover 510.

Similar to the embodiment of FIG. 1, the open slot 120 on the metal back cover 510 may be used to constitute the open slot antenna. The feeding element 150 may be used to excite the antenna structure 100, and the first capacitor 130 connected to the feeding element 150 may be used to adjust impedance matching of the antenna structure 100. Moreover, the antenna structure 100 may cover the first frequency band and the second frequency band through the first slot 121 and the second slot 122. The antenna structure 100 may further form the third slot through the arrangement of the adjustment element 160 and the second capacitor 140, and cover the third frequency band through the third slot. Detailed configurations and operations of the components of the embodiment of FIG. 5 are included in the embodiment of FIG. 1, and description thereof is not repeated.

In summary, the antenna structure of the invention includes the metal element having the open slot, and the feeding element and the adjustment element are configured corresponding to the first slot and the second slot in the open slot. Moreover, the feeding element is electrically connected to the metal element through the first capacitor, and the adjustment element is electrically connected to the metal element through the second capacitor. In this way, the antenna structure may be operated in the first frequency band through the first slot and operated in the second frequency band through the second slot. Moreover, the antenna structure may form the third slot through the arrangement of the adjustment element and the second capacitor, and the antenna structure may be operated in the third frequency band through the third slot. In other words, the antenna structure may directly use the open slot in the metal element to form the open slot antenna, and the antenna structure has the characteristic of multi-band operation, such that the electronic device may support multiple wireless communication protocols.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An antenna structure, comprising:
    a metal element, having an open slot, and the open slot having an open end, a first slot and a second slot, wherein the first slot and the second slot are respectively disposed on two opposite sides of the open end;
    a first capacitor and a second capacitor;
    a feeding element, crossing the first slot, wherein a first end of the feeding element has a feeding point, the feeding point and the first capacitor are disposed on two opposite sides of the first slot, and a second end of the feeding element is electrically connected to the metal element through the first capacitor; and
    an adjustment element, disposed in the second slot, wherein a first end of the adjustment element is electrically connected to the metal element, and a second end of the adjustment element is electrically connected to the metal element through the second capacitor, wherein a second end of the adjustment element and the second capacitor are interconnected with each other to form a joint, and the joint is disposed in the second slot.

2. The antenna structure as claimed in claim 1, wherein the antenna structure is operated in a first frequency band, and a length of the first slot is ¼ wavelength of the first frequency band.

3. The antenna structure as claimed in claim 2, wherein the antenna structure is further operated in a second frequency band, and a length of the second slot is ¼ wavelength of the second frequency band.

4. The antenna structure as claimed in claim 2, wherein a length from the feeding element to the open end of the open slot is ⅛ wavelength of the first frequency band.

5. The antenna structure as claimed in claim 3, wherein the antenna structure is further operated in a third frequency band, and a length from the adjustment element to the open end of the open slot is ¼ wavelength of the third frequency band.

6. The antenna structure as claimed in claim 1, wherein a length of the first slot is greater than a length of the second slot.

7. The antenna structure as claimed in claim 1, wherein the adjustment element and the second capacitor are disposed in the second slot, and the adjustment element and the second capacitor are respectively connected to two sides of the second slot.

8. The antenna structure as claimed in claim 7, wherein the open end of the open slot is located at an edge of the metal element, and a shape of the open slot is a T-shape.

9. The antenna structure as claimed in claim 8, wherein the first slot and the second slot are respectively parallel to the edge of the metal element.

10. The antenna structure as claimed in claim 1, wherein the first capacitor and the second capacitor are respectively a chip capacitor or a distributed capacitor.

11. The antenna structure as claimed in claim 1, wherein the second capacitor comprises:
    a first conductive sheet, electrically connected to the second end of the adjustment element; and
    a second conductive sheet, located in the second slot and electrically connected to the metal element, wherein an orthogonal projection of the second conductive sheet on the metal element is partially overlapped with an orthogonal projection of the first conductive sheet on the metal element.

12. The antenna structure as claimed in claim 1, wherein the antenna structure is adapted to an electronic device, and the metal element of the antenna structure is constituted by a metal back cover of the electronic device.

* * * * *